US007651648B2

(12) United States Patent
Eustace et al.

(10) Patent No.: US 7,651,648 B2
(45) Date of Patent: Jan. 26, 2010

(54) METHODS OF FORMING AN ARTICLE COMPRISING MELT-PROCESSABLE THERMOPLASTIC COMPOSITIONS

(75) Inventors: Paul Eustace, Stockton-on-Tees (GB); Nicholas John Maston, Middlesbrough (GB); John Robert Oliver, Yarm (GB)

(73) Assignee: Lucile International UK Limited, Hampshire (GB)

( * ) Notice: Subject to any disclaimer, the term of this patent is extended or adjusted under 35 U.S.C. 154(b) by 0 days.

(21) Appl. No.: 12/330,667

(22) Filed: Dec. 9, 2008

(65) Prior Publication Data
US 2009/0085242 A1    Apr. 2, 2009

Related U.S. Application Data

(62) Division of application No. 11/046,738, filed on Feb. 1, 2005, now Pat. No. 7,497,979, which is a division of application No. 10/049,604, filed as application No. PCT/GB00/03184 on Aug. 16, 2000, now abandoned.

(30) Foreign Application Priority Data
Aug. 17, 1999  (GB) ................... 9919304.7

(51) Int. Cl.
B29C 43/24  (2006.01)
B32B 27/30  (2006.01)
C08L 33/12  (2006.01)

(52) U.S. Cl. .................. 264/173.19; 264/171.1; 264/175; 264/284; 264/293; 428/327; 428/517; 428/518; 428/520; 525/226; 525/227; 525/228

(58) Field of Classification Search ........................ None
See application file for complete search history.

(56) References Cited

U.S. PATENT DOCUMENTS

| | | | |
|---|---|---|---|
| 3,345,434 A | | 10/1967 | Griffith et al. |
| 3,793,402 A | * | 2/1974 | Owens ........................ 525/81 |
| 4,268,549 A | | 5/1981 | Fink et al. |
| 4,876,311 A | | 10/1989 | Hennig et al. |
| 5,318,737 A | * | 6/1994 | Trabert et al. .......... 264/173.16 |
| 5,621,028 A | | 4/1997 | Lichtenstein et al. |
| 5,639,404 A | * | 6/1997 | Meier-Kaiser et al. ..... 264/40.1 |
| 5,880,207 A | | 3/1999 | Delphin et al. |
| 6,042,945 A | | 3/2000 | Maekawa |
| 6,908,670 B1 | | 6/2005 | Maekawa |

FOREIGN PATENT DOCUMENTS

| | | |
|---|---|---|
| CA | 2194092A A1 | 6/1997 |
| DE | 4232501 A1 | 3/1994 |
| DE | 19725984 A1 | 12/1998 |
| EP | 0 189 279 B1 | 7/1986 |
| EP | 0 216 139 B1 | 4/1987 |
| EP | 0 270 865 B1 | 6/1988 |
| EP | 0 277 874 B1 | 8/1988 |
| EP | 0 279 724 B1 | 8/1988 |
| EP | 0 342 283 B1 | 11/1989 |
| EP | 0 390 146 B1 | 10/1990 |
| EP | 0 453 198 B1 | 10/1991 |
| EP | 0 458 520 A2 | 11/1991 |
| EP | 0 465 049 A2 | 1/1992 |
| EP | 0 491 266 A2 | 6/1992 |
| EP | 0 494 534 B1 | 7/1992 |
| EP | 0 495 593 A1 | 7/1992 |
| EP | 0 522 351 B1 | 1/1993 |
| EP | 0 522 791 B1 | 1/1993 |
| EP | 0 528 196 B1 | 2/1993 |
| EP | 0 570 782 B1 | 11/1993 |
| EP | 0 571 918 B1 | 12/1993 |
| EP | 0 654 454 A1 | 5/1995 |
| EP | 0 776 915 B1 | 6/1997 |
| EP | 0 781 808 B1 | 7/1997 |
| EP | 0 881 261 A1 | 12/1998 |
| EP | 0 897 954 A1 | 2/1999 |
| EP | 0 992 540 A1 | 4/2000 |
| EP | 1 022 115 A1 | 7/2000 |
| EP | 1 086 966 A1 | 3/2001 |
| EP | 1 087 000 A1 | 3/2001 |
| EP | 1 106 649 A1 | 6/2001 |
| EP | 1 142 951 A1 | 10/2001 |
| EP | 1 162 217 A1 | 12/2001 |
| GB | 2 178 746 B1 | 2/1987 |
| GB | 2 233 979 A | 1/1991 |
| WO | WO-99/12986 A1 | 3/1999 |
| WO | WO-99/65964 A1 | 12/1999 |
| WO | WO-00/08098 A1 | 2/2000 |
| WO | WO-00/24825 A1 | 5/2000 |
| WO | WO-00/29480 A1 | 5/2000 |

(Continued)

OTHER PUBLICATIONS

Chemical Abstract 133:239303.
Cogswell, "Polymer Melt Rheology," 1997, p. 121.
Machine Translation of DE19725984.
Machine Translation of DE4232501.

*Primary Examiner*—David Buttner
(74) *Attorney, Agent, or Firm*—Venable LLP; Keith G. Haddaway; Michael A. Sartori

(57) ABSTRACT

Methods of making articles are described comprising the steps of applying a capstock material over a layer of a substrate material and then calendaring said capstock material and said substrate material with calendaring rolls to form an article, wherein said capstock material contacts said calendar rolls for a shorter period of time than said substrate material. The capstock material comprises a melt-processable thermoplastic composition comprising a) 50-99.5 wt. % of a melt-processable thermoplastic polymer and b) 0.5-50 wt. % of a particulate polymer comprising the residues of a monomer mixture comprising 50-100 wt. % of MMA, at least 0-50 % of an ethylenically unsaturated comonomer comprising at least one alkyl acrylate or methacrylate and 0-10 wt. % of a copolymerisable cross-linking monomer said particles having a maximum dimension of 5 mm.

21 Claims, No Drawings

FOREIGN PATENT DOCUMENTS

| WO | WO-00/63289 A1 | 10/2000 |
| WO | WO-00/78863 A2 | 12/2000 |
| WO | WO-01/10936 A1 | 2/2001 |
| WO | WO-01/57102 A1 | 8/2001 |
| WO | WO-01/57133 A1 | 8/2001 |
| WO | WO 01/62843 A2 | 8/2001 |

* cited by examiner

METHODS OF FORMING AN ARTICLE COMPRISING MELT-PROCESSABLE THERMOPLASTIC COMPOSITIONS

This application is a divisional of U.S. patent application Ser. No. 11/046,738, filed Feb. 1, 2005, now U.S. Pat. No. 7,497,979, which is a divisional of U.S. patent application Ser. No. 10/049,604, filed May 8, 2002, now abandoned, which is a national stage of International Application No. PCT/GB00/03184, filed Aug. 16, 2000, designating the United States, and claiming priority from Application No. 9919304.7, filed in the United Kingdom on Aug. 17, 1999, the contents of which are incorporated by reference in their entirety.

The present invention relates to melt-processable thermoplastic compositions, especially to acrylic compositions. Particularly, although not exclusively, the invention relates to compositions for making articles having surfaces exhibiting relatively low gloss.

Thermoplastic compositions, especially acrylic compositions, are used in a variety of applications, some of which may demand a particular surface appearance, such as low gloss. Acrylic compositions containing gloss modifiers, usually to reduce the surface gloss of the compositions, are already known and used in the industry. Commonly used gloss modifying compounds are talcs or other inorganic compounds. Talcs can generally be used to reduce surface gloss to a minimum of about 20 (measured at 75° observation angle). However, when a very low gloss or matte surface finish is required, e.g. for building components such as vinyl siding or the like, talcs or other conventional gloss reducing compounds may be ineffective or may be required to be present at such high levels that the other properties of the composition are compromised. There is therefore a need for an acrylic composition which is suitable for producing articles which have a relatively low gloss surface but which are comparable in physical properties to higher gloss acrylic compositions.

WO-A-97/14749 describes acrylic compositions having the appearance of a natural granite comprising a polymethyl methacrylate matrix having dispersed within it particles comprising 75-90 wt % of PMMA, at least 10% of an ethylenically unsaturated comonomer and at least 0.4 wt % of a cross-linker. The granite articles are prepared by casting a syrup of polymer in monomer containing the particles and curing to produce a glossy article.

U.S. Pat. No. 5,242,968 describes a cast acrylic article having a textured but glossy surface formed by casting a polymer in monomer syrup containing ground PMMA particles in a cell and curing the mixture so that it polymerises.

U.S. Pat. No. 5,304,592 describes acrylic articles which contain particles of a thermoplastic and/or thermoset plastic which are visually different from the acrylic matrix in which they are suspended and which have different viscosities or melting points from the plastic of the matrix yet which have a similar density to the matrix so that the particles do not settle during processing.

It is an object of the present invention to provide a melt-processable thermoplastic composition which address problems associated with prior art compositions.

According to a first aspect of the present invention, there is provided a melt-processable thermoplastic composition comprising;
a) 50-99.5 wt % of a melt-processable thermoplastic polymer; and
b) 0.5-50% wt of a particulate polymer comprising the residues of a monomer mixture comprising 50-100 wt % of methyl methacrylate (MMA), at least 0-50 wt % of an ethylenically unsaturated comonomer comprising at least one alkyl acrylate or methacrylate and 0-10 wt % of a copolymerisable cross-linking monomer, said particles having a maximum dimension of 5 mm.

The thermoplastic polymer preferably forms a matrix throughout which the particulate polymer is dispersed. The particulate polymer may, however, be more or less concentrated in some parts of the matrix than others as a result of a melt-processing method which may be used to form the composition. Nevertheless, it has been found that the incorporation of the particulate polymer into the melt-processable thermoplastic polymer matrix enables articles to be produced by melt-processing techniques such as injection moulding or extrusion, which have an excellent low-gloss surface finish.

The melt-processable thermoplastic polymer may be selected from a range of materials, e.g. PVC, polystyrene, polyesters, styrene-acrylonitrile copolymers and terpolymers, e.g. ABS, styrene-acrylonitrile(SAN), acrylonitrile-styrene-acrylic(SAN), polycarbonate, nylon, acrylic polymers such as polmethylmethacrylate and its copolymers with other (meth)acrylates, provided that the polymer(s) selected may be melt processed at a temperature which is below the temperature at which the particulate acrylic polymer thermally degrades, e.g. below about 300° C. The melt-processable polymer may also comprise a blend of thermoplastic polymers. In one preferred form of the invention, the melt-processable thermoplastic polymer which forms a matrix is a polymethylmethacrylate (PMMA) homopolymer or copolymer derived from a monomer mixture comprising 60-100 wt % methyl methacrylate and 0-40 wt % of at least one other copolymerisable alkyl acrylate or methacrylate. A preferred PMMA matrix is a copolymer of 60-98 wt % methyl methacrylate and 2-40 wt % of at least one other copolymerisable alkyl acrylate selected from a $C_{1-4}$alkyl, e.g. methyl, ethyl or butyl, hydroxyethyl, 2-ethylhexyl, cyclohexyl or phenyl acrylates. Of the aforesaid, a $C_{1-4}$ alkylacrylate (especially n-alkyl acrylates where isomers can exist) is preferred; methyl, ethyl and butyl acrylates are more preferred; ethyl and butyl (especially n-butyl)acrylates are especially preferred; and ethyl acrylate is most preferred. A preferred copolymer comprises 80-98 wt % methyl methacrylate residues and 2-20 wt % of the residues of at least one said alkyl acrylate. Preferably, said preferred copolymer comprises at least 82 wt %, more preferably at least 84 wt %, especially at least 85 wt % methyl methacrylate. The amount of methyl methacrylate may be less than 95 wt %, suitably less than 92 wt %, preferably less than 90 wt %, more preferably less than 88 wt %, especially for use in construction, such as for vinyl sidings as hereinafter described. Said preferred copolymer may include at least 5 wt %, preferably at least 8 wt %, more preferably at least 10 wt %, especially at least 12 wt % of said at least one said alkyl acrylate. Preferably said at least one alkyl acrylate comprises a single alkyl acrylate. The matrix polymer may additionally contain residues of other materials, e.g. thermal stabilisers (e.g. alkyl mercaptans as are commonly used in moulding polymer formulations), polymerisation initiators, lubricants, mould release agents, UV and light stabilisers, pigments, dyes, opacifiers, impact modifying compounds (including rubbery materials and core-shell type impact modifying particles) and flame retardants. Preferably, the matrix polymer includes a major amount of melt-processable thermoplastic polymer, especially a major amount of said polymethylmethacrylate homopolymer or copolymer.

In the context of this specification, a "major" amount suitably refers to at least 60 wt %, preferably at least 75 wt %, more preferably at least 90 wt %, especially at least 95 wt %.

The melt flow index (MFI) of said melt-processable thermoplastic polymer at 230° C. using a 3.6 Kg weight over 10 minutes (according to DIN53735) is suitably at least 5. For some, preferred applications, said MFI may be at least 10, suitably at least 15, preferably at least 20, more preferably at least 25 and in some cases at least 27. The MFI may be less than 35, preferably less than 32.

The particulate polymer is a homopolymer or copolymer which comprises 50-100 wt % MMA, at least 0-10 wt % of an ethylenically unsaturated comonomer comprising at least one alkyl acrylate or methacrylate and 0-10 wt % of a copolymerisable cross-linking monomer. Suitable particles are described in WO-A-97/14749 for incorporation into cast acrylic products to impart the appearance of granite.

Said particulate polymer is suitably formed from the residues of a monomer mixture comprising at least 50 wt %, preferably at least 59.9 wt %, more preferably at least 69.9 wt %, especially at least 79.9 wt % of methyl methacrylate (MMA) In some cases, the amount of said MMA may be at least 62 wt % or even 83 wt %. The amount of MMA may be less than 99 wt %, suitably less than 95 wt %, preferably less than 90 wt %, more preferably less than 88 wt %, especially less than 86 wt %. Said monomer mixture may also include at least 1 wt %, suitably at least 5 wt %, preferably at least 10 wt %, more preferably at least 12 wt %, especially at least 14 wt % of a copolymerisable acrylic comonomer. The amount of said copolymerisable acrylic comonomer may be less than 50 wt %, suitably less than 30 wt %, preferably less than 25 wt %, more preferably less then 20 wt %, especially less than 18 wt %. Said acrylic comonomer may be of a type as described above for said copolymerisable alkyl acrylate of said PMMA matrix. Said comonomer is preferably an alkyl acrylate, especially a $C_{1-4}$ alkyl acrylate, preferred examples of which include ethyl acrylate and butyl acrylate. The particulate polymer may be formed from one or more copolymerisable acrylic comonomers. Where more than one acrylic copolymer is used in conjunction with MMA described, suitably the sum of the wt % of the copolymerisable acrylic comonomers (excluding multifunctional acrylic monomers) is as described above. Said monomer mixture may also include at least 0.1 wt %, suitably at least 0.2 wt %, preferably at least 0.3 wt %, more preferably at least 0.4 wt % of a comonomer which is capable of forming cross-linking with the polymer. The amount of said comonomer may be less than 10 wt %, suitably less than 5 wt %, preferably less than 4 wt %, more preferably less than 3 wt %, especially less than 2 wt %. In some cases, 1 wt % or less (preferably less than 1 wt %) of said comonomer may be used. Preferred comonomers capable of forming cross-linking are multi-functional and are preferably multi-functional acrylate monomers, for example di(alk)acrylate compounds such as dimethacrylate compounds.

In one case, said particulate polymer is formed from the residues of a monomer mixture comprising 70-95 wt % MMA, 5-30 wt % of a copolymerisable acrylic comonomer (preferably an alkyl acrylate) and 0.1-5 wt % of a comonomer which is capable of forming cross-linking within the polymer.

Said thermoplastic composition may include at least 1 wt %, preferably at least 3 wt %, more preferably at least 5 wt %, especially at least 6 wt % of said particulate polymer. The amount of said particulate polymer may be 40 wt % or leas, preferably 30 wt % or less, more preferably 20 wt % or less, especially 15 wt % or less.

The particulate polymer may have a wide size distribution and particles thereof may have a maximum size of about 5 mm. Preferably, the particles have a maximum dimension which is less than 1 mm, for example particles which pass though a 500 µm sieve may be used. Preferably, a major amount, more preferably all, of said particles of said particulate polymer of a type described in (b) above can pass through a 350 µm sieve, more preferably through a 300 µm sieve, especially through a 250 µm sieve. In one preferred form particles having a size distribution from <10 to about 600 µm are used. The weight averaged diameter of said particles of said particulate polymer may be greater than 100 µm, suitably greater than 150 µm. The weight averaged diameter may be less than 500 µm, suitably less than 400 µm, preferably less than 300 µm, more preferably less than 250 µm. The aforementioned weight averaged diameters may be assessed as described in ASTM D1921.

Suitably, at least 20%, preferably at least 40%, more preferably at least 60%, especially at least 80% of particles of said particulate polymer are between 60 (250 µm) and 80 (177 µm) mesh.

It has been found that in high shear processes such as extrusion and injection moulding, the particles of said particulate polymer are broken up into smaller particles so that, surprisingly, the particles do not produce an unduly rough or lumpy surface, even when particles as large as 250 µm are used in the thermoplastic composition and the composition is extruded to form a layer having a thickness below 100 µm. The particle size to be used in any situation may be selected based upon its availability and the constraints of handling and processing such particles. However, preferred particle sizes are as is described.

The particulate polymer is preferably made by grinding a larger piece or pieces of polymer of the required composition. It has been found that the particles formed in this way are irregular with many corners and sharp edges. The polymer may be made by a variety of polymerisation methods, e.g. suspension, solution, emulsion, or bulk polymerisation methods.

It has been found that when a sheet of the thermoplastic polymer composition has been extruded and calendered, there are marked differences between the gloss on the surface of the sheet which has been in contact with the calender rolls and the opposite surface which has been in contact with air. For this reason, when the low-gloss thermoplastic composition of the invention is applied over a layer of a different polymer, e.g. by coextrusion, it is preferred that the surface of the low-gloss composition is processed so that it is run through the calender roll stack on the air side of the sample.

According to a second aspect of the present invention, there is provided a method of preparing a melt-processable thermoplastic composition, (preferably according to said first aspect), the method comprising contacting, preferably mixing:

a) 50-99.5 wt % of a melt-processable thermoplastic polymer; and b) 0.5-50% wt of a particulate polymer comprising the residues of a monomer mixture comprising 50-100 wt % of methyl methacrylate (MMA), at least 0-50 wt % of an ethylenically unsaturated comonomer comprising at least one alkyl acrylate or methacrylate and 0-10 wt % of a copolymerisable cross-linking monomer, said particles having a maxim dimension of 5 mm.

Said particulate polymer may have a hardness of less than go when measured on the Rockwell Hardness M-Scale according to IS02039-2.

Said melt-processable polymer and said particulate polymer are preferably not cast. Said melt-processable polymer and said particulate polymer are preferably mixed by extrusion, suitably using a high shear extruder. Said melt-processable polymer and said particulate polymer may be subject to a shear rate of at least 100 s$^{-1}$, preferably at least 115 s$^{-1}$, more preferably at least 130 s$^{-1}$, especially at least 140 s$^{-1}$ during said mixing. The shear rate may be less than 200 s$^{-1}$, preferably less than 180 s$^{-1}$, more preferably less than 160 s$^{-1}$.

Said mixing by extrusion is preferably undertaken under conditions such that particles of said particulate polymer are broken down. Thus, preferably, the weight averaged diameter of said particulate polymer before said extrusion is greater than after said extrusion.

Said mixed/extruded melt-processable polymer and said particulate polymer is preferably formed into discrete units, for example pellets, of said melt-processable thermoplastic composition, suitable for subsequent use.

Preferably, said melt-processable polymer and said particulate polymer are not caused to chemically react during said mixing and/or extrusion and, more preferably, are not caused to react at any stage in the preparation of said discrete units. Thus, preferably the melt-processable polymer is not cured during and/or after contact with said particulate polymer. Especially, said melt-processable polymer and said particulate polymer do not chemically react at any stage, for example even up to the formation of an article of a type described herein.

The preparation of said particulate polymer preferably includes the polymerisation of a monomer mixture which suitably includes monomers and/or other ingredients described herein, suitably in the amounts described herein. The polymer formed is preferably subjected to a size reduction step suitably so as to produce particles having particle sizes as described herein. The particles are then suitably mixed with said melt-processable thermoplastic polymer to form said melt-processable thermoplastic composition.

According to a third aspect of the invention, there is provided a method of forming an article which comprises shaping a melt-processable thermoplastic composition according to said first aspect or prepared according to said second aspect in order to form said article.

In the method, said melt-processable thermoplastic composition may be subjected to conditions such that particles of the particulate polymer in said melt-processable thermoplastic composition are broken down, thereby to reduce their size. Thus, preferably the weight averaged diameter of said particulate polymer before said shaping is greater than after said shaping. Preferably, the melt-processable thermoplastic composition and/or the conditions to which this is subjected to form the article is/are selected such that a surface of the article formed of said thermoplastic composition includes substantially no particles of diameter of greater than 100 μm. This may be assessed microscopically, for example by incident light optical microscopy and by scanning electron microscopy of sections taken perpendicularly to the surface.

In the method, suitably said melt-processable thermoplastic composition is subjected to a shear rate of at least 100 s$^{-1}$, preferably at least 115 s$^{-1}$, more preferably at least 130 s$^{-1}$, especially at least 140 s$^{-1}$ during the shaping of said article. However, where said melt-processable thermoplastic composition is co-extruded, for example with PVC, a low shear extruder may be used in which case the shear rate will be lower than these discussed above.

The composition may be shaped in the form of sheets or film. It may be extruded or moulded into various shapes or co-extruded or laminated onto other materials, for example rigid or foamed forms of ABS, PVC, polystyrene polymers including HIPS and other modified styrene polymers, or polyolefins. The composition may also be co-extruded or laminated onto metals. Sheets prepared as described (e.g. co-extruded or laminated sheets) may be thermoformed or otherwise formed into a desired shape by a suitable means.

Advantageously, where injection moulding is used, low surface gloss can be achieved even on highly polished moulds. This may provide a route to producing trim parts to match low gloss extruded or co-extruded panels or to make clear plaques.

The composition may advantageously be used to provide a low gloss, pigmented, co-extruded capstock for less weatherable materials such as PVC (e.g. for vinyl siding, window frames and sheet), HIPS (e.g. for shutters, doors, sheet) and ABS (e.g. for shutters, doors, sheet and window frames).

The method may include preparing a layer from said melt-processable thermoplastic composition which is thinner than the diameters of some particles of particulate polymer used to prepare said melt-processable thermoplastic composition.

According to a fourth aspect of the invention, there is provided an article made in a method according to said third aspect.

Thus, suitably, there is provided an article formed by shaping a molten thermoplastic composition formed by melting an acrylic composition comprising:

a) 50-99 wt % of a melt-processable thermoplastic polymer and b) 0.5-50% wt of a particulate polymer comprising the residues of a monomer mixture comprising 50-100 wt % of MMA, at least 0-50 wt % of an ethylenically unsaturated comonomer comprising at least one alkyl acrylate or methacrylate and 0-10 wt % of a copolymerisable cross-linking monomer said particles, having a maximum dimension of 5 mm.

The article need not be entirely formed from the molten thermoplastic composition. There are many applications in which an article may comprise other materials, e.g. it may be a laminate of the thermoplastic composition and another material or the thermoplastic composition of the invention may form only a surface coating on an article. Such composite articles may be formed by forming a separate thermoplastic layer and bonding it to the finished article or the thermoplastic layer may be applied by techniques such as coextrusion with another thermoplastic or by extrusion coating.

Said article may be a coextruded or laminated component. Said article preferably includes a substrate and a capstock material wherein said capstock material comprises said melt-processable thermoplastic composition.

Said component may be for use in construction.

Said component may be for use in construction of a building. For example, it could be a solid or coextruded building component, for example a soffit board, barge board, fascia board, cladding board, siding, gutter, pipe, shutters, window casement, window board, window profile, conservatory profile, door panels, door casement, roofing panel, architectural accessory or the like. A preferred component for use in construction is a co-extruded component comprising a substrate, for example made of PVC, HIPS or ABS (especially PVC), and said melt-processable thermoplastic material provided as a capstock thereon. An especially preferred component is vinyl siding comprising PVC and a capstock of said thermoplastic material.

Said component may be for use in constructing a vehicle or in another automotive application, both as a bulk material or as a co-extruded laminate. Such applications include, but are not limited to, decorative exterior trim, cab mouldings, bumpers (fenders), louvers, rear panels, accessories for buses, trucks, vans, campers, farm vehicles and mass transit vehicles, side and quarter panel trim or the like.

Preferably, a surface of the article formed of said thermoplastic composition has a roughness (Ra) of less than 2000 angstroms, preferably less than 1750 angstroms. The roughness may be at least 350 angstroms.

Suitably, a surface of the article formed of said thermoplastic composition has a surface gloss, measured at a 75° observation angle (according to ASTM D3679), of less than 85, preferably less than 75, more preferably less than 65, especially less than 55. In a preferred embodiment, the surface gloss, measured as described, is in the range 4.5 to 30, more preferably 9 to 20.

Suitably, when a surface of the article formed of said thermoplastic composition is tested for impact resistance in accordance with ASTM D4226, the mean failure height is not less than 7.5 inches (19.1 cm), more preferably not less than 9.5 inches (24.1 cm), especially not less than 10.5 inches 126.7 cm). The mean failure height may be less than 15 inches (38.1 cm).

According to a fifth aspect, there is provided an article which comprises a thermoplastic composition, wherein said article and/or said compositions) are as described in any statement herein.

According to a sixth aspect of the intention, there is provided an article formed from a thermoplastic composition which comprises a melt-processable thermoplastic polymer and a particulate polymer, wherein the weight averaged diameter of particles of said particulate polymer prior to formation of said article is greater than the diameter after formation of the article.

According to a seventh aspect of the invention, there is provided a method of forming an article which comprises a substrate and, on the substrate, a capstock layer, the method comprising: selecting, for example preparing, a melt-processable thermoplastic composition comprising a melt-processable thermoplastic polymer and a particulate polymer wherein some of the particles of the particulate polymer have a diameter of x µm; and extruding, preferably co-extruding, said selected composition to form a capstock layer of a thickness less than x µm. The thickness may be less than 95% of x, preferably less than 75% of x, more preferably less than 50% of x.

The invention extends to an article which includes a substrate and a capstock material prepared from a thermoplastic composition as described herein.

A capstock layer as described herein may have a thickness of less than 200 µm, preferably less than 175 µm, more preferably less than 150 µm, especially less than 125 µm. The thickness may be greater than 50 µm. A thickness of about 100 µm is preferred.

Any feature of any aspect of any invention or embodiment described herein may be combined with any feature of any aspect of any other invention or embodiment described herein.

Specific embodiments of the invention will now be described, by way of example.

EXAMPLE 1

A mixture containing a 92% wt commercial acrylic polymer DIAKON™ MG102 (Ineos Acrylics, U.K.) which is a copolymer of methyl methacrylate and ethyl acrylate and has a molecular weight of approximately 90,000 and 8% of a white pigmented masterbatch was compounded together and pelleted using a Werner & Pfleiderer ZSK30 30 mm twin screw extruder running at 230° C. and 275 rpm. The resulting pellets were extruded into a 1 mm thick×100 mm wide sheet using a 1.5" (30 mm) single screw extruder operating at 230° C. and at a line speed of approximately 1 m/minute. The extruded sheet was run through a 3-roll calendering stage upon exit from the extruder. The rolls were heated to about 80° C. and were 50 mm in radius.

The gloss of each surface of the sheet was measured using a Rhopoint Novo-Gloss meter measuring at an angle of 60° C. As will be understood by those experienced in the art of extruding thermoplastic sheet, one surface is in contact with the heated calendering rolls for longer than the other surface and so these surfaces were measured separately. The surface in contact with the rolls for the longest time is referred to as "highly calendered (hc)" whilst the other surface is referred to as "less calendered (lc)". The gloss of each surface was measured at 10 positions along the direction of extrusion of the sheet and the average result is shown in the Table 1.

Preparation of Cross-Linked Acrylic Particles

A cross-linked acrylic polymer was made by bulk polymerisation in a sealed nylon bag a monomer mixture comprising 83% MMA, 8% n-butyl acrylate, 8% ethyl acrylate and 1% ethylene glycol dimethacrylate together with initiators and stabilisers.

The mixture was subjected to a pre-programmed thermal cycle as conventionally used for bulk polymerisation processes and then cooled. After cooling to ambient temperature, the bag and thermocouple were removed and discarded. The resultant polymer was ground and sieved with a standard wirecloth sieve. The sieve fractions which passed through a standard US 60 mesh sieve (aperture size 250 µm) were used for these Examples Particle size analysis showed that 82% of the particles were between 60 (250 µm) and 80 (177 µm) mesh. The particles appeared to be of irregular shape approximating to pyramidal.

The particles of cross-linked acrylic polymer were added to the polymer and colour masterbatch mixture. The mixture was compounded using a ZSK 30 extruder (at 230° C., 275 rpm) and a shear rate of about $-140s^{-1}$) and pelletised and then sheet samples were extruded and their gloss measured, as described above.

TABLE 1

| Particle content (wt %) | Surface | Gloss units |
|---|---|---|
| 0 | hc | 87 |
|   | lc | 87 |
| 10 | hc | 65 |
|   | lc | 46 |
| 20 | hc | 48 |
|   | lc | 26 |

The results show that the presence of the cross-linked acrylic particles reduced the gloss of both of the surface of the extruded sheet significantly. A difference in gloss between the surfaces of the same sheet was also noted for those samples which contained the particles but not for the sample containing no particles. Examination of the samples showed that the shape of the particles had not been changed significantly but their size had been reduced to about 50-70 µm.

EXAMPLE 2

PVC pellets (EVC Compounds RG7-760-1476) were tumble blended with cross-linked acrylic particles as described in Example 1 and extruded into sheet at 180° C. as described in Example 1.

A sample without particles was made in the same way. The gloss was measured as described in Example 1 and the results are as shown in Table 2.

TABLE 2

| Particle content (wt %) | Surface | Gloss units |
|---|---|---|
| 0 | hc | 80 |
|   | lc | 37 |
| 10 | hc | 54 |
|    | lc | 20 |
| 20 | hc | 11 |
|    | lc | 8.5 |

EXAMPLE 3

Particles of a green coloured cross-linked acrylic polymer were made from a monomer mixture comprising 84% MMA, 15.5% butyl acrylate and 0.5% ethylene glycol dimethacrylate together with stabilisers, initiators and a chain transfer agent as described in Example 1.

The particles were ground and sieved as before. An impact modified grade of acrylic moulding polymer (DIAKON™ ST35G8) was coloured using a green pigmented masterbatch at 8% wt. The green particles were compounded into the base polymer on the twin screw extruder and the resulting pellets were injection moulded using a Colourstubbe injection moulding apparatus at 230° C. to form a 75×50×3 mm plaque sample. The gloss was measured as described earlier and the results are shown in Table 3.

TABLE 3

| Particle content (wt %) | Gloss units |
|---|---|
| 0 | 85 |
| 5 | 15 |
| 10 | 8 |
| 20 | 7 |

EXAMPLE 4

Cross-linked acrylics polymer was prepared by bulk polymerisation of 83.18 wt % MMA, 14.68 wt % co-monomer (n-butyl acrylate) 0.61 wt % cross-linker, 0.49 wt % of chain transfer agent and 0.05 wt % initiator.

The polymer was ground and sieved to produce a particle size distribution wherein 36.7% w/w lay between 60 and 100 mesh (250 and 150 μm) and 35.1% w/w were between 150 and 30 μm and the material had a weight average particle diameter of 187.9 μm.

8 wt % of the particulate polymer was compounded into a commercially available impact modified acrylic copolymer (DIAKON™ ST35G8 as described above) using a ZSK30 co-rotating twin screw extruder at 230° C. as described in Example 1.

The material thus obtained was co-extruded using a single screw extruder as an approximately 100 μm layer onto rigid PVC to form panels of approximately 1 mm total thickness. The panels were impact tested following ASTM D4226 and the surface gloss was evaluated using a 75° meter to ASTM D3679 as described above. The results were as follows:
ASTM D4226 Mean Failure Height (inches)=11.1
Gloss (75° obs)=51
Appearance of sheet=Matte surface

EXAMPLE 5

The particulate polymer of Example 4 was compared to cross-linked bead particles having weight averaged diameters of 20, 40, 80 and 100 μm (referred to as Examples 5.1, 5.2, 5.3 and 5.4 respectively).

The particulate polymer and the cross-linked bead particles were compounded into an acrylic copolymer (as described in example 4) at a loading of 5 wt %, using a ZSK30 co-rotating twin screw extruder at a temperature of 230° C. Co-extruded sheet of nominal thickness approx. 1 mm was produced with the acrylic material forming a cap of thickness approximately 100 μm. The surface gloss of the sheets was measured using a Rhopoint Novogloss Gloss Meter and the results obtained are shown in the table below.

| Sample | Initial particle diameter/μm | 20° Gloss | 60° Gloss | 85° C. |
|---|---|---|---|---|
| Eg 4 | 190 | 3.9 +/− 0.2 | 29.8 +/− 0.6 | 33.5 +/− 1.2 |
| Eg 5.1 | 20 | 5.7 +/− 0.6 | 30.4 +/− 0.8 | 27.4 +/− 1.6 |
| Eg 5.2 | 40 | 6.3 +/− 0.4 | 34.3 +/− 1.4 | 33.8 +/− 2.4 |
| Eg 5.3 | 80 | 13.6 +/− 1 | 44.6 +/− 3.2 | 43.9 +/− 1.2 |
| Eg 5.4 | 100 | 15.4 +/− 1.7 | 47.5 +/− 2.9 | 47.7 +/− 1 |

The gloss data for the cross-linked bead materials of Examples 5.1 to 5.4 exhibit a linear dependence of surface gloss on bead diameter for all gloss measurement angles. However, the material of Example 5 does not fit with these linear trends. In this case, individual particles could not be identified in the surface, while the presence of large discrete particle was observed for materials of Examples 5.3 and 5.4. More particularly, incident light optical microscopy confirmed that particles of the same size as added to the extruder were present in the material for Examples 5.

The invention claimed is:

1. A method of forming an article which includes a substrate and a capstock material, wherein said substrate material comprises a polymer which is different than the capstock material and said capstock material comprises a melt-processable thermoplastic composition comprising:
   (a) 50-99.5 wt % of a melt-processable thermoplastic polymer; and
   (b) 0.5 to 50 wt % of a particulate polymer comprising a homopolymer of methyl methacrylate or a copolymer comprising the residues of a monomer mixture comprising at least 50 wt % methyl methacrylate and up to 50 wt % of a copolymerisable acrylic comonomer comprising at least one alkyl acrylate or methacrylate and 0 to 10 wt % of a copolymerisable cross-linking monomer, said particles having a maximum dimension of 5 mm and having a weight averaged diameter of between 100 μm and 500 μm;
the method comprising the steps of applying the capstock material over a layer of the substrate material and then calendaring said capstock material and said substrate material with calendaring rolls to form said article, wherein said capstock material contacts said calendar rolls for a shorter period of time than said substrate material.

2. A method as claimed in claim 1 wherein said particulate polymer further includes at least 0.1 wt % to 10 wt % of a copolymerisable cross-linking monomer.

3. A method as claimed in claim 2 wherein the particulate polymer comprises a copolymer formed from the residues of a monomer mixture comprising 70 to 95 wt % methyl methacrylate, 5 to 30 wt % of said copolymerisable acrylic comonomer and 0.1 to 5 wt % of said copolymerisable cross-linking monomer.

4. A method as claimed in claim 3 wherein said copolymerisable acrylic comonomer of the particulate polymer comprises at least one alkyl acrylate.

5. A method as claimed in claim 4 wherein said alkyl acrylate is selected from the group consisting of ethyl acrylate or butyl acrylate.

6. A method as claimed in claim 3 wherein said copolymerisable acrylic comonomer is present in an amount of at least 12 wt % and less than 18 wt % of said particulate polymer.

7. A method as claimed in claim 2 wherein said particulate polymer comprises a copolymer comprising 5 wt % and less than 20 wt % of said copolymerisable acrylic comonomer and at least 0.3 wt % and 1 wt % or less of said copolymerisable cross-linking monomer.

8. A method as claimed in claim 1 wherein the particulate polymer comprises a copolymer and said copolymerisable acrylic comonomer comprises at least one alkyl acrylate.

9. A method as claimed in claim 8 wherein said alkyl acrylate is selected from the group consisting of ethyl acrylate or butyl acrylate.

10. A method as claimed in claim 8 wherein said copolymerisable acrylic comonomer is present in an amount of at least 12 wt % and less than 18 wt % of said particulate polymer.

11. A method as claimed in claim 1 wherein said particles have a maximum dimension which is less than 1 mm.

12. A method as claimed in claim 1 wherein the weight average diameter of said particles of the particulate polymer is greater than 150 μm as measured in accordance with ASTM D1921.

13. A method as claimed in claim 1 wherein at least 20 wt % of said particles of the particulate polymer are between 60 (250 μm) and 80 (177 μm) mesh.

14. A method as claimed in claim 2 wherein said particulate polymer comprises a copolymer formed from the residues of a monomer mixture comprising at least 79.9 wt % methyl methacrylate.

15. A method as claimed in claim 7 wherein said particulate polymer comprises a copolymer formed from the residues of a monomer mixture comprising at least 79.9 wt % methyl methacrylate.

16. A method as claimed in claim 1 wherein said particulate polymer is present in an amount of at least 3 wt % and less than 20 wt % of said melt-processable thermoplastic composition.

17. A method as claimed in claim 1 wherein the melt-processable thermoplastic polymer forms a matrix and is a polymethyl methacrylate homopolymer or a copolymer derived from a monomer mixture comprising at least 60 wt % methyl methacrylate and up to 40 wt % of at least one other copolymerisable alkyl acrylate or methacrylate.

18. A method as claimed in claim 7 wherein the melt-processable thermoplastic polymer forms a matrix and is a polymethyl methacrylate homopolymer or a copolymer derived from a monomer mixture comprising at least 60 wt % methyl methacrylate and up to 40 wt % of at least one other copolymerisable alkyl acrylate or methacrylate.

19. A method as claimed in claim 1 wherein the melt-processable thermoplastic composition is formed by mixing said melt-processable polymer and said particulate polymer by extrusion under conditions such that said particles of the particulate polymer are broken down.

20. A method as claimed in claim 1 wherein a surface of the article formed of said melt-processable thermoplastic composition has a surface gloss measured at 75° observation angle (according to ASTM D3679) of less than 65.

21. A method as claimed in claim 1 wherein said article is a component for use in construction and is co-extruded component wherein said substrate is made of PVC, HIPS, or ABS.

* * * * *